United States Patent [19]

King, Jr.

[11] 4,331,472
[45] May 25, 1982

[54] METAL REMOVAL APPARATUS AND METHOD

[75] Inventor: James R. King, Jr., Rochester, N.Y.

[73] Assignee: Ktrom Industries, Inc., Wilmington, Calif.

[21] Appl. No.: 266,048

[22] Filed: May 21, 1981

[51] Int. Cl.³ .............................................. C22B 5/00
[52] U.S. Cl. ..................................... 75/109; 266/170; 428/313; 428/407; 428/461
[58] Field of Search ............... 428/313, 403, 407, 461; 75/109, 118 P; 266/170

[56] References Cited

U.S. PATENT DOCUMENTS

| | | | |
|---|---|---|---|
| 1,568,464 | 1/1926 | Neill | 75/109 |
| 1,617,353 | 2/1927 | Snelling | 75/109 |
| 3,369,801 | 11/1965 | Hartman | 75/118 P |
| 3,640,787 | 2/1972 | Heller | 428/407 |
| 3,692,291 | 9/1972 | MacKay | 266/170 |
| 4,035,181 | 7/1977 | Fisch | 75/109 |
| 4,039,297 | 8/1977 | Takenaka | 428/407 |
| 4,156,604 | 5/1979 | Fisch et al. | 75/109 |

*Primary Examiner*—Brian E. Hearn
*Attorney, Agent, or Firm*—Lyon & Lyon

[57] ABSTRACT

A first metal is removed from solutions such as polluted water by contacting the solution with a metallic exchange medium. The metallic exchange medium comprises a plurality of buoyant elements, each comprising a substrate coated with a second metal sufficiently reactive to undergo an electrochemical exchange reaction with the first metal. The substrate can be expanded polystyrene beads and the metal can be iron such as sponge iron of small particle size.

25 Claims, 3 Drawing Figures

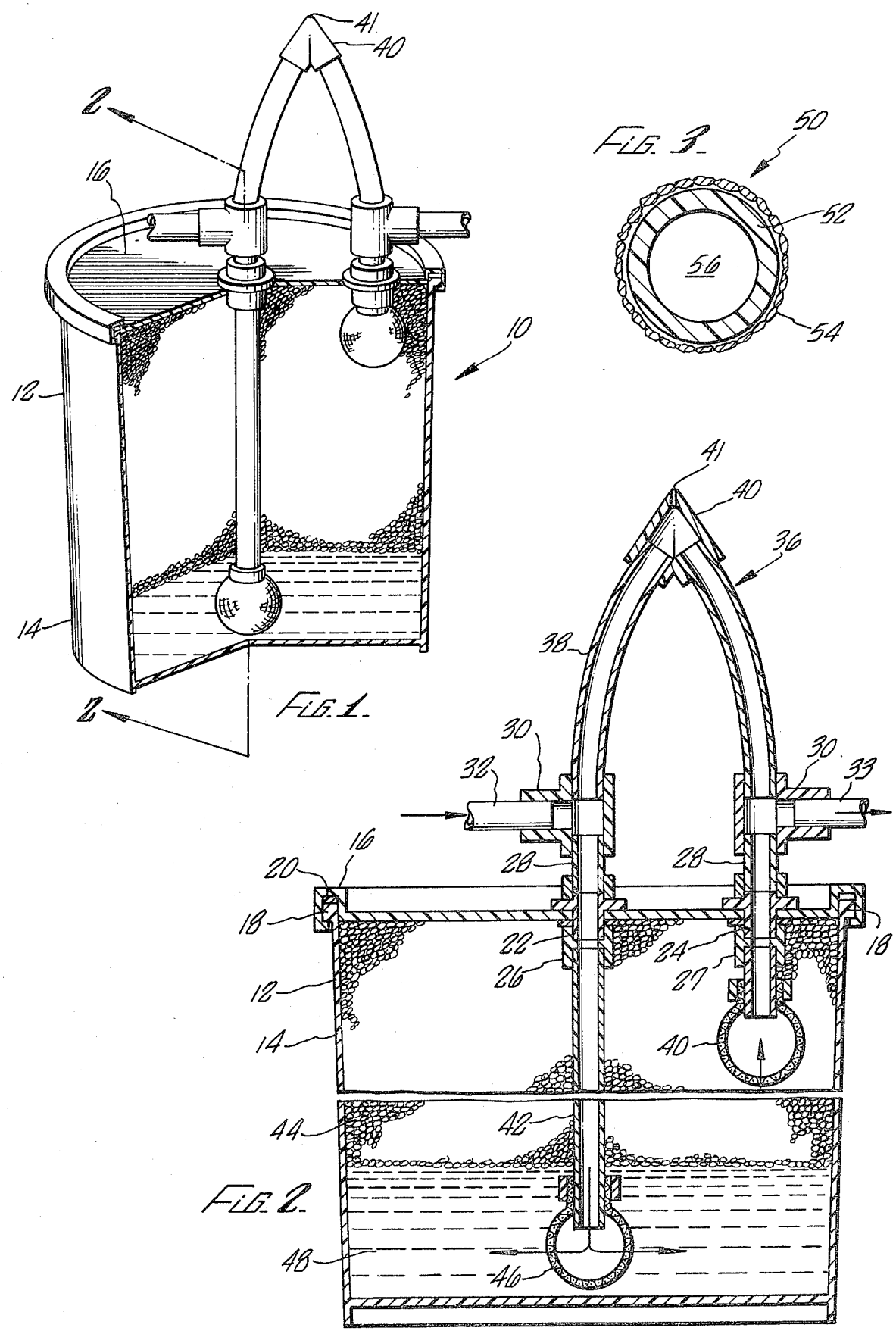

METAL REMOVAL APPARATUS AND METHOD

CROSS-REFERENCE

This application is related to my copending application entitled "Silver Removal Apparatus and Method," filed on the same day as this application, Ser. No. 266,066, which is incorporated herein by this reference.

BACKGROUND

This invention is directed to removing metals from solutions, and particularly, polluted or contaminated water.

Dissolved metals are commonly removed from solutions to recover the metal as a valuable product and/or to remove the metal as a pollutant. For example, silver is removed from photographic solutions to recover the silver as a valuable product as well as to permit the solution to be discharged without causing pollution.

Numerous devices have been developed for removing silver from used photographic fixer solutions. Such devices are described in U.S. Pat. Nos. 3,369,801; 3,692,291; 4,035,181; and 4,156,604; all of which are incorporated herein by this reference.

These devices utilize an electron exchange reaction, i.e., an electrochemical exchange reaction which occurs between a more noble metal and a less noble metal in order to recover the silver in the used solution. The less noble metal in these devices is iron in the form of inexpensive steel wool or a window screen. When the silver rich solution is passed over the iron, an electron exchange exchange occurs wherein the iron metal $Fe^O$ is oxidized to ferric or ferrous ion and the silver ion ($Ag^+$) is reduced to silver metal ($Ag^O$). The silver precipitates from the solution to form a sludge, from which the silver is recovered. The spent solution from the device is discharged to a sewer or returned to a fixing tank.

The use of steel wool or window screen as the silver source has significant disadvantages. Among these problems is inefficient use of the iron, a substantial portion of the iron not being used to replace silver. Further, frequent clogging and channeling have been experienced. Channeling is a particular problem as the iron in the steel wool or window screen is depleted, resulting in voids forming in the exchange medium. These voids provide a path of lower resistance to flow and loss of efficiency in silver recovery and material use.

A further disadvantage is that these units can require the use of steel wool or window screen of different sizes or weights dependent upon the silver content or pH of the solution being treated. This can require the availability of two or more types of silver recovery devices, or the use of a plurality of devices.

Another disadvantage of existing recovery devices is that it is difficult to purify the recovered silver. The recovered silver is mixed in with large particles of window screen or steel wool. In order to refine the silver, it is first necessary to comminute the silver sludge containing particulate iron into a fine powder, such as by ball milling. This is a time-consuming and costly step.

A further disadvantage of the existing devices is that leakage between the container lid and body can occur. A monocoque container cannot be used because the steel wool or window screen needs to be placed in the container. Such leakage can cause significant property damage.

In view of these problems, it is apparent that there is a need for a metal recovery apparatus that makes efficient use of the exchange medium, avoids clogging and channeling in use, does not leak, maintains good contact with the metal containing solution, can be used for a wide variety of solutions having different metal contents and different pH, and recovers metal in a form that does not require comminution for refining.

SUMMARY

The present invention is directed to an apparatus having these features. The apparatus is useful for recovering metals from a solution, such as silver from a photographic fixer solution. The apparatus comprises a container formed of a material substantially non-reactive with the solution. The container has an inlet for introducing an influent solution containing a first metal into the container and an outlet for removing spent solution from the container, the spent solution having first metal removed therefrom. The container contains a metallic exchange medium that comprises a plurality of buoyant elements. The elements are sufficiently buoyant to float in the solution. Each element comprises a substrate coated with a second metal, the substrate being substantially non-reactive with the solution. The second metal is sufficiently reactive to undergo an electrochemical exchange reaction with the first metal.

A preferred substrate is a polymeric substrate such as expanded polystyrene beads, which are hollow and contain air. The metal can be iron. Preferably the iron is sponge iron, secured to the substrate with an adhesive. Preferably the sponge iron is from about +150 mesh to about −10 mesh, and more preferably from about +80 mesh to about −20 mesh. Preferably the beads are from about ⅛ to about ½ inch, and more preferably from about ¼ to about ⅜ inch in diameter. Preferably the iron used is substantially free of zinc, aluminum, and copper to insure that these pollutants do not go into solution.

Preferably, the container is not filled with the exchange medium, so that a void can be left at the bottom of the container for precipitated first metal to collect. This can be achieved by using an amount of metallic exchange medium so that the medium comprises from about 70% to about 90% of the volume of the container.

The precipitated metal can easily be recovered by withdrawing the contents of the container and pyrolyzing the polymeric substrate in a single heating step. This leaves substantially only first and second metal particles that usually can be refined without comminution.

This apparatus and method have general applicability, also being useful for recovering not only silver, but also metals that are more noble than iron. Further, the exchange medium can be formed using metallic coatings other than iron coatings, so that metals less noble than iron can be recovered.

DRAWINGS

These and other features, aspects, and advantages of the present invention will become better understood with reference to the following description, appended claims, and accompanying drawings where:

FIG. 1 is a perspective view, partially broken away, of an apparatus for recovering metal according to the present invention;

FIG. 2 is a longitudinal sectional view of the apparatus of FIG. 1 taken on line 2—2 of FIG. 1; and FIG. 3 is a sectional view of one of the buoyant elements of the metallic exchange medium used with the apparatus of FIG. 1.

DESCRIPTION

The present invention is directed to an apparatus and a method for removing and recovering metals from solutions. Although the present invention will be principally described with regard to removing and recovering silver from used photographic fixing solutions, the apparatus and method can also be used for removing other metals from solutions, and for removing silver from solutions other than photographic fixing solutions.

With reference to FIGS. 1 and 2, an apparatus 10 for removing silver from photographic fixing solutions comprises a pail shaped container 12 that includes a monocoque body portion 14 forming the side and bottom walls of the container 12, and a top lid 16. The top edge of the body portion has an integral strengthening rib 18 over which the lid 16 snap fits. There is a gasket 20 between the rib 18 and the lid 16 to prevent leakage of photographic fixing solution from the container 12.

There are two holes or ports through the lid 16, an inlet hole 22 in the center of the lid and an outlet hole 24 toward the outer edge of the lid. The inlet hole and the outlet hole are provided with a gasketed plastic fitting 26 and 27, respectively, with a gasket 29 on the underside of the lid to prevent leakage of photographic fixing solution around the outside of the fittings 26 and 27. Both gasketed fittings 26 and 27 are connected outside of the container 12 by means of plastic tubing 28 to a rotatable T-connector 30. The T-connector 30 for the inlet port 22 is connected to a length of tubing 32 through which influent liquid passes. Likewise, the T-connector 30 for the outlet port 24 is provided with tubing 33 for passage of the effluent from the container 12. The T-connectors are rotatable so that influent and effluent liquid can pass to and from the container in any desired direction.

The two T-connectors 30 are joined by an inverted V-shaped assembly 36 comprising two pieces of tubing 38, each piece of tubing being connected at one end to one of the T connectors 30 and at the other end to a 90° elbow fitting 40, which is at a higher elevation than the elevation of the inlet 22 and the outlet 24. An antisiphon hole 41 is provided at the apex of the elbow fitting 40. The assembly 36 serves as an emergency gravity bypass for rapid discharge of influent solution during flow surges or in case there is a plug in the container 12.

The inlet plastic fitting 26 has connected thereto on the inside of the container 12 a vertically oriented tube 42 which extends almost to the bottom of the container 12. In the container is a metallic exchange medium 44. Both the bottom of the inlet tube 42 and the outlet fitting 27 are provided with a fine mesh screen or strainer 46 made of sufficiently small mesh to prevent the metallic exchange medium 44 from plugging the inlet tube 42 or passing out of the container through the outlet 24.

The container can be any size convenient to handle, and generally from about 1 to 10 gallons, and more preferably from about 3 to about 7 gallons. Alternatively, rather than using a container 12 that is suitable for only one use, a reusable column that can be repeatedly be refilled with metallic exchange medium 44 can be used. For example, a 5-½ feet tall column 13 inches in diameter is satisfactory. Such a tall and narrow column is advantageous in that influent liquid contacts a larger amount of exchange medium 44 than if the container were short and wide.

Rather than using a container 12 comprising a body portion 14 and a lid 16, the container can be provided as a single integral monocoque structure. This has the advantage that leaks cannot occur between the body portion 14 and the lid 16 as can occur with prior art units. By using the metallic exchange medium 44 rather than steel wool or window screen, it is possible to fill a sealed container through the inlet 22 and/or outlet 24.

The choice of the materials for the apparatus 10 is important, in that all of the components of the apparatus, with the exception of the metallic exchange medium 44, need to be substantially non-reactive with the influent liquid. For photographic fixing solutions, preferably all materials used are polymeric. For example, the container 12, including the body portion 14 and the lid 16, is formed of a plastic material such as polyethylene, polypropylene, polystyrene, nylon, or polyvinylchloride. This can be done by forming the container 12 from such a material, or forming the container from a reactive material which is a lined with a non-reactive plastic material. Likewise, the fittings 26 and 27, tubing 32, 34, 38, and 42, as well as the T-connectors 30 and elbow 40 are formed of a substantially non-reactive material such as polyvinylchloride. The gasket 20 between the lid 16 and body portion 14 of the container and the gasket of the gasketed plastic fittings 26 can be formed of neoprene. The screens 46 can be formed of nylon or fiberglass, among other materials.

From FIGS. 1 and 2, it can be seen that liquid is introduced into the container 12 at the bottom of the container in a void space 48. The liquid then passes up through the metallic exchange medium 44 toward the top of the container, to pass out from the container through the outlet 24. An advantage of this configuration is that the influent liquid is distributed evenly across the cross-sectional area of the container 12 at the bottom, thereby insuring even flow upwardly through the metallic exchange medium 44 with minimum channeling occurring.

The exchange medium 44 comprises a plurality of bouyant elements 50, one of which is shown in FIG. 3. The bouyant elements 50 can be of any shape, including oval and spherical. Each element comprises a substrate 52 coated with metal 54. The substrate 52 is chosen so that the elements 50 are buoyant in the container when the container is filled with the solution from which metal is being removed. As used herein, the term "buoyant" means that an element 50 floats in a solution that the element is being used for treating.

The substrate is substantially non-reactive with the liquid being treated. For a photographic fixing solution, a non-reactive polymeric material such as polyethylene, nylon, polypropylene, polystyrene, or polyvinylchloride can be used. Preferably the beads are hollow, and filled with air 56 to insure buoyancy. The preferred substrate is expanded polystyrene beads. Such beads are available from Vertex of Vernon, Calif., under Catalog Designation EPS.

The substrate preferably has a diameter of from about ⅛ inch to about ½ inch, and, more preferably, of from about ¼ inch to about ⅜ inch. If the buoyant elements are too small, plugging of the metallic exchange medium can occur. If the buoyant elements are significantly larger than about ⅜ inch to about ½ inch, then the rate of recovery of metal is decreased due to less available surface area of the metallic exchange medium.

The metal 54 can be held on the beads 50 by means of an adhesive 55 such as a synthetic organic elastomer type adhesive. A suitable adhesive is available from Industrial Polychem, Inc. of Gardena, Calif., under Catalog No. 5031. The adhesive chosen needs to be one that when cured does not attack the substrate, and is also stable and substantially non-reactive when exposed to the liquid being treated. Since photographic fixer solutions can be acid or alkaline, the adhesive should be stable in both mild acid and mild alkaline solutions.

For recovery of silver, the metal 54 can be a metal that is less noble than silver such as aluminum, zinc, copper or iron. A disadvantage of zinc, aluminum and copper is that each is a water pollutant in its own right. Therefore, for recovery of silver, preferably iron is used. Preferably, the iron used is substantially free of zinc, aluminum, and copper to avoid introducing pollutants into the solution being treated. Moreover, preferably the iron is substantially free of carbon, i.e., steel is not used. This is because the presence of carbon can interfere with the recovery of silver. The recovery of silver depends upon the acidic photographic solution etching the metallic exchange medium, resulting in sloughing off of precipitated silver. If the iron contains carbon, less etching can occur, and the silver does not slough off, thereby preventing iron underlying deposited silver from entering into the electrochemical exchange reaction.

Preferably, sponge iron is used. Preferably, the sponge iron is from about +150 mesh (does not pass through a 150 mesh sieve) to about −10 mesh (passes through a 10 mesh sieve). This is because with particles substantially smaller than about 150 mesh, reduction in recovery of silver is noted. It is believed that this results from generation to hydrogen due to the acidic photographic fixer solution quickly reacting with the iron. Such quick reaction occurs because of the high surface area of the small iron particles. The generation of hydrogen can lower the pH of the photographic fixer solution, which results in increased usage of iron and undesirable break-up of the ammonium thiosulfate present in the photographic fixing solution.

When the iron particles are larger than about 10 mesh, there is inadequate surface area for quick and efficient recovery of silver.

In view of these considerations, more preferably the iron is from about +80 mesh to about −20 mesh.

The buoyant elements 50 can be formed by putting 1 gallon volume of expanded polystyrene particles in a cement mixer with 8 fluid ounces of adhesive solution. The adhesive solution is formed by diluting 0.4 parts by volume adhesive 5031 from Industrial Polychem, Inc. from Gardena, Calif., with 0.06 parts by volume methyl ethyl ketone and 0.54 parts by volume hexane. The adhesive coating 53 and expanded polystyrene particles 52 are mixed for about 1-½ to 2 minutes. Then, the sponge iron 54 is added, in an amount of 2 pounds per 1 gallon volume expanded polystyrene beads. The cement mixer continues to run until the expanded polystyrene particles are substantially completely coated with iron, and then the adhesive is permitted to cure.

Preferably the container 12 is not completely filled with the metallic exchange medium 44 so that there is a void space 48 at the bottom for even distribution of incoming liquid, and to provide a space for recovered silver to collect. An adequate void space can be provided by using an amount of metallic exchange medium having a volume from about 70% to about 90% volume of the container 12.

To use the apparatus 10, influent liquid is introduced through tubing 32, into the inlet tube 42 for discharge adjacent the bottom of the container 12. The liquid percolates upwardly through the metallic exchange medium 44, where a first metal in the influent liquid undergoes an electrochemical exchange reaction with a more noble second metal constituting the reaction exchange medium 44. Spent liquid of a lower content of the first metal than the influent liquid is discharged through the outlet 24.

The apparatus 10 is suitable for photographic fixer solutions. As used herein, the term "photographic fixer solution" refers to both fixer solutions and bleach-fixer solutions. A fixer solution conventionally is a solution comprising water, sodium or ammonium thiosulfate, sodium or potassium sulfite, sodium or potassium hydroxide, and acetic or sulfuric acid. It can also contain aluminum sulfate. A bleach-fixer solution contains the same constituents, but also includes ferric ammonium ethylene diamine tetracetic acid.

The optimum pH for recovering silver from photographic fixing solution is from about 4.5 to about 5.5. The pH of an available photographic fixing solution can be as low as 4 or, in the case of a bleach-fixer solution, as high as 8. It is possible to modify the pH of the influent liquid to a pH of from about 4.5 to about 5.5 for effective recovery of silver.

More than one container can be used. If desired, containers 10 can be connected in series and/or in parallel.

In use, an apparatus 10 comprising a five-gallon container 12 can recover about 120 ounces of silver from a photographic fixer solution at an influent rate of from about 300 to about 500 milliliters per minute, with about 95% to about 99% recovery of the incoming silver. This is a significant improvement over comparable prior art devices using steel wool or window screen which can treat only a maximum of about 300 milliliters per minute.

As the electrochemical exchange reaction occurs, the iron coating 54 is depleted and silver precipitates on the exchange medium 44. As the reaction further precedes, the silver sloughs off into the void 48 at the bottom of the container, forming a silver sludge.

The silver can be recovered by removing the contents of the container from the container, then drying the contents and pyrolyzing the substrate. This can be effected by drying at an elevated temperature sufficiently high to pyrolyze the plastic substrate 52 and the adhesive coating 55. Materials such as polystyrene can be pyrolyzed in about 30 minutes at a temperature of about 500° F. After drying and pyrolysis, which can be effected in a single heating step, all that remains is a fine powder principally constituting particulate silver and small iron particles that originally constituted the metallic coating 54 on the substrate 52. This powder can be refined to recover the silver according to conventional techniques, without the need for any further comminution.

The apparatus 10 provides substantial advantages compared to prior art devices for recovering silver from photographic fixing solutions. Principally, more photographic fixing solution can be treated with the apparatus 10 than with comparable prior art devices. It is believed that this results from reduction in channeling, avoidance of plugging, and better contact between the fixing solution and the iron than is possible with prior art devices. A further advantage is that a sealed container can be used, thereby minimizing chances that the container will leak. Further, the recovered product can be refined without the need for an expensive and difficult comminution step.

Although the present invention has been described in considerable detail with reference to certain preferred versions thereof, other versions are possible. For example, rather than supplying an integral container containing the reaction medium 44, the reaction medium 44 can be supplied separately for use in a reusable container, such as the tall and narrow column previously described. Therefore, the spirit and scope of the appended claims should not necessarily be limited to the description of the preferred versions contained herein.

What is claimed is:

1. Apparatus for removing a first metal from a solution comprising a container formed of a material substantially non-reactive with the solution, the container having an inlet for introducing influent solution into the container and an outlet for removing spent solution with first metal removed therefrom from the container, a metallic exchange medium within the container, the metallic exchange medium comprising a plurality of buoyant elements each comprising a substrate coated with a second metal, the substrate being substantially non-reactive with the influent solution and the second metal being sufficiently reactive to undergo an electrochemical exchange reaction with the first metal.

2. The apparatus of claim 1 in which the substrate is polymeric.

3. The apparatus of claim 2 in which the substrate comprises expanded polystyrene beads.

4. The apparatus of claim 1 in which the second metal is of a particle size of from about +150 mesh to about −10 mesh.

5. The apparatus of claim 4 in which the second metal is of a particle size of from about +80 to about −20 mesh.

6. The apparatus of claim 1 in which the volume of the metallic exchange medium comprises from about 70 to about 90% of the volume of the container.

7. The apparatus of claim 1 in which the influent solution is a photographic fixer solution.

8. The apparatus of claim 1 in which the substrate is from about $\frac{1}{8}$ inch to about $\frac{1}{2}$ inch in diameter.

9. The apparatus of claim 8 in which the substrate is from about $\frac{1}{4}$ inch to about $\frac{3}{8}$ inch in diameter.

10. Apparatus for removing a first metal from an influent solution comprising
a container formed of a material substantially nonreactive with the influent solution,
an inlet for introducing the influent solution into the container,
an outlet for removing spent solution with first metal removed therefrom from the container, and
a metallic exchange medium within the container, the metallic exchange medium comprising expanded polystyrene beads coated with a second metal of a particle size of from about +100 mesh to about −10 mesh, the volume of the metallic exchange medium comprising from about 70 to about 90% of the volume of the container, the second metal being sufficiently reactive to undergo an electrochemical exchange reaction with the first metal.

11. The apparatus of claim 10 in which the second metal is of a particle size of from about +80 mesh to about −20 mesh.

12. The apparatus of claim 1 or 10 wherein the inlet and the outlet are located so that influent solution is introduced to the bottom of the container and spent solution is withdrawn from the top of the container.

13. The apparatus of claim 1 or 10 in which the second metal is copper.

14. The apparatus of claim 1 or 10 in which the second metal is aluminum.

15. The apparatus of claim 10 in which the beads are from about $\frac{1}{8}$ inch to about $\frac{1}{2}$ inch in diameter.

16. The apparatus of claim 15 in which the beads are from about $\frac{1}{4}$ inch to about $\frac{3}{8}$ inch in diameter.

17. A method for removing a first metal from an influent solution comprising the steps of:
(a) selecting an apparatus comprising a container formed of a material substantially non-reactive with the influent solution, the container having an inlet for introducing the influent solution into the container, and an outlet for removing spent solution of reduced first metal content from the container, the container containing a metallic exchange medium comprising a plurality of buoyant elements each comprising a substrate coated with a second metal, the substrate being substantially non-reactive with the influent solution and the second metal being sufficiently reactive to undergo an electrochemical exchange reaction with the first metal;
(b) introducing the influent solution into the container, wherein the first metal and second metal undergo an electrochemical exchange reaction to form spent solution of reduced first metal content; and
(c) removing spent solution of reduced first metal content from the container.

18. The method of claim 17 in which the volume of the metallic exchange medium is from about 70 to about 90% of the volume of the container.

19. The method of claim 17 or 18 in which the influent solution is introduced to the bottom of the container and spent solution is removed from the top of the container.

20. The method of claim 17 in which the substrate is a pyrolyzable polymeric material.

21. The method of claim 17 in which the second metal is of a particle size of from about +150 mesh to about −10 mesh.

22. The method of claim 21 in which the second metal is of a particle size of from about +80 mesh to about −20 mesh.

23. The method of claim 17, 20, 21, or 22 including the additional steps of subsequently removing the contents of the container from the container, drying the removed contents, and pyrolyzing the substrate to leave substantially only second metal and first metal particles that can be refined without comminution.

24. The method of claim 23 in which the steps of drying and pyrolyzing comprise heating the removed contents to a sufficiently high temperature for a sufficient time to both dry and pyrolyze the contents simultaneously.

25. A method for recovering a first metal from a solution comprising the step of contacting the solution with a metallic exchange medium comprising a plurality of buoyant elements comprising a substrate substantially non-reactive with the influent solution and a coating of a second metal, the elements being sufficiently buyant to float in the influent solution, the second metal being sufficiently reactive to undergo an electrochemical exchange reaction with the first metal.

* * * * *